United States Patent
Fukushima et al.

[11] Patent Number: 5,995,167
[45] Date of Patent: Nov. 30, 1999

[54] APPARATUS FOR CONTROLLING DISPLAY MEMORY FOR STORING DECODED PICTURE DATA TO BE DISPLAYED AND METHOD THEREOF

[75] Inventors: Michihiro Fukushima, Fujisawa; Shuji Abe, Kawasaki, both of Japan

[73] Assignee: Kabushiki Kaisha Toshiba, Kawasaki, Japan

[21] Appl. No.: 08/965,006

[22] Filed: Nov. 5, 1997

[30] Foreign Application Priority Data

Nov. 6, 1996 [JP] Japan .................................. 8-293795

[51] Int. Cl.$^6$ ....................................................... H04N 9/64
[52] U.S. Cl. ........................... 348/714; 348/714; 348/715; 348/716; 348/719; 345/185; 345/186; 345/188; 345/196
[58] Field of Search .................................. 348/714, 715, 348/716, 717, 718, 719; 345/185, 196, 186, 182, 188; H04N 5/907

[56] References Cited

U.S. PATENT DOCUMENTS

| | | | |
|---|---|---|---|
| 5,386,233 | 1/1995 | Keith ........................................ | 348/719 |
| 5,446,560 | 8/1995 | Schwartz . | |
| 5,623,311 | 4/1997 | Phillips et al. ........................... | 348/396 |
| 5,729,303 | 3/1998 | Oku et al. ................................. | 348/716 |
| 5,878,173 | 3/1999 | Hashimoto et al. .................... | 382/282 |
| 5,910,824 | 6/1999 | Yu ........................................... | 348/714 |

FOREIGN PATENT DOCUMENTS

| | | |
|---|---|---|
| 0 503 956 | 9/1992 | European Pat. Off. . |
| 8-126011 | 5/1996 | Japan . |

Primary Examiner—John K. Peng
Assistant Examiner—Paulos Natnael
Attorney, Agent, or Firm—Pillsbury Madison & Sutro LLP

[57] ABSTRACT

An apparatus for controlling a display memory for storing decoded picture data is disclosed, that comprises a data dividing portion for dividing decoded picture data as one macroblock in a vertical direction, a write address generator for generating the binary value of a write address necessary for writing the divided picture data to the display memory, a slice counter for counting the number of slice lines of picture data that has been written to the display memory, a rotate-shifter for rotating and shifting the binary value of the generated write address to the left by a first bit number corresponding to the number of slice lines counted, a means for writing the divided picture data to the display memory corresponding to the write address that has been rotated and shifted, a read address generator for generating the binary value of a read address necessary to read picture data from the display memory, a rotate-shifter for rotating and shifting the binary value of the generated read address to the left by a second bit number corresponding to output data of the slice counter, and a means for reading picture data from the display memory corresponding to the read address that has been rotated and shifted.

8 Claims, 6 Drawing Sheets

ROTATED-SHIFTED AMOUNT OF WRITE ADDRESS OF FIRST
SLICE LINE = 0

| 0  | 16 | | $x*2^4$    |
|----|----|---|------------|
| 1  | 17 | | $x*2^4+1$  |
| 2  | 18 | | $x*2^4+2$  |
| ⋮  | ⋮  | ------ | ⋮     |
| 15 | 31 | | $x*2^4+15$ |

FIG. 3

ROTATED-SHIFTED AMOUNT OF READ ADDRESS OF FIRST SLICE
LINE = 0

| 0  | 16 | | $x*2^4$    |
|----|----|---|------------|
| 1  | 17 | | $x*2^4+1$  |
| 2  | 18 | | $x*2^4+2$  |
| ⋮  | ⋮  | ------ | ⋮     |
| 15 | 31 | | $x*2^4+15$ |

FIG. 4

ROTATED-SHIFTED AMOUNT OF WRITE ADDRESS OF SECOND
SLICE LINE = 4(n)

| 0   | 256 | | $(x*2^4)*2^4$     |
|-----|-----|---|-------------------|
| 16  | 272 | | $(x*2^4+1)*2^4$   |
| 32  | 288 | | $(x*2^4+2)*2^4$   |
| ⋮   | ⋮   | ------ | ⋮            |
| 240 | 496 | | $(x*2^4+15)*2^4$  |

FIG. 5

ROTATED-SHIFTED AMOUNT OF READ ADDRESS OF SECOND
SLICE LINE = 4(n)

| 0   | 256 | | $(x*2^4)*2^4$     |
|-----|-----|---|-------------------|
| 16  | 272 | | $(x*2^4+1)*2^4$   |
| 32  | 288 | | $(x*2^4+2)*2^4$   |
| ⋮   | ⋮   | ------ | ⋮            |
| 240 | 496 | | $(x*2^4+15)*2^4$  |

FIG. 6

APPARATUS FOR CONTROLLING DISPLAY MEMORY FOR STORING DECODED PICTURE DATA TO BE DISPLAYED AND METHOD THEREOF

BACKGROUND OF THE INVENTION

1. Field of the Invention

The present invention relates to an apparatus for controlling a writing operation and a reading operation of a display memory for decoded picture data to be displayed on a monitor and a method thereof.

2. Description of the Related Art

In the MPEG2 system, picture data can be encoded in both a frame structure and a field structure. The encoded picture data is decoded each macroblock, of which is composed of 16×16 pixels.

To display decoded picture data in the raster scanning method, a display memory is required so as to hold the decoded picture data until it is displayed. The picture data as a macroblock is read and written from/to the display memory in the following manner.

As shown in FIG. 8, the decoded picture data as one macroblock are arranged in the horizontal direction and successively written to the display memory. Each row of macroblock arranged in the horizontal direction is referred to as slice. Each slice is composed of a sequence of 16 pixels. Hereinafter, a block of slices that are present at the same vertical position is referred to as one slice line.

As shown in FIG. 9A, picture data stored in the display memory is read downwardly line by line and thereby the read picture data is displayed in the raster scanning method. Thus, unless picture data for one slice line has been decoded it cannot be displayed in the raster scanning method. Consequently, as shown in FIG. 9B, the display memory requires a storage capacity for two slice lines. Thus, the display memory has an area 101 for storing a slice line that is read and displayed and an area 102 for storing data of the next slice line.

In addition, an area from which picture data has been read is assigned to a write area for the subsequently decoded picture data. However, as shown in FIG. 10, since decoded picture data is written as one macroblock to the memory, unless picture data for one slice line has been read, the memory area for the slice line can be assigned to a memory area for the subsequently decoded picture data. Thus, as shown in FIG. 9B, the display memory should have a storage capacity for at least two slice lines.

SUMMARY OF THE INVENTION

An object of the present invention is to provide an apparatus that allows the required storage capacity of a display memory used in a unit that displays picture data that has been decoded as one macroblock to be decreased and a method thereof.

To accomplish the above-described object, a first aspect of the present invention is an apparatus for controlling a display memory for storing decoded picture data as one macroblock, comprising a dividing means for dividing decoded picture data as one macroblock in a vertical direction, a write address generating means for generating the binary value of a write address necessary for writing the divided picture data to the display memory, a means for counting the number of slice lines of picture data that has been written to the display memory, a first shifting means for rotating and shifting the binary value of the generated write address to the left by a first bit number corresponding to the number of slice lines counted, a means for writing the divided picture data to the display memory corresponding to the write address that has been rotated and shifted, a read address generating means for generating the binary value of a read address necessary to read picture data from the display memory, a second shifting means for rotating and shifting the binary value of the generated read address to the left by a second bit number corresponding to output data of the counting means, and a means for reading picture data from the display memory corresponding to the read address that has been rotated and shifted.

A second aspect of the present invention is a method for controlling a display memory for storing decoded picture data as one macroblock, comprising the steps of dividing decoded picture data as one macroblock in a vertical direction, generating the binary value of a write address necessary for writing the divided picture data to the display memory, rotating and shifting the binary value of the generated write address to the left by a first bit number corresponding to the number of slice lines counted, writing the divided picture data to the display memory corresponding to the write address that has been rotated and shifted, generating the binary value of a read address necessary to read picture data from the display memory, rotating and shifting the binary value of the generated read address to the left by a second bit number corresponding to the number of splice lines of picture data that has been written to the display memory, and reading picture data from the display memory corresponding to the read address that has been rotated and shifted.

In other words, according to the present invention, when picture data that has been decoded as one macroblock is written to the display memory and then the picture data is read from the display memory and displayed in the order of the raster scanning method, a memory area from which picture data has been just read is assigned as a write area for picture data of the next slice line. Thus, according to the present invention, the storage capacity necessary for the display memory can be decreased. In more reality, so far, a memory with a storage capacity that stores picture data for two slice lines was required. However, according to the present invention, the required storage capacity can be decreased to a storage capacity for one slice line.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 3 is a schematic diagram for explaining a controlling process for writing a first slice line of picture data that has been input to the apparatus shown in FIG. 1 to a display memory;

FIG. 4 is a schematic diagram for explaining a controlling process for reading the first slice line of picture data from the display memory of the apparatus shown in FIG. 1;

FIG. 5 is a schematic diagram for explaining a controlling process for writing a second slice line of picture data that has been input to the apparatus shown in FIG. 1 to the display memory;

FIG. 6 is a schematic diagram for explaining a controlling process for reading the second slice line of picture data from the display memory of the apparatus shown in FIG. 1;

DESCRIPTION OF PREFERRED EMBODIMENT

Next, with reference to the accompanying drawings, an embodiment of the present invention will be described.

Figure 1:
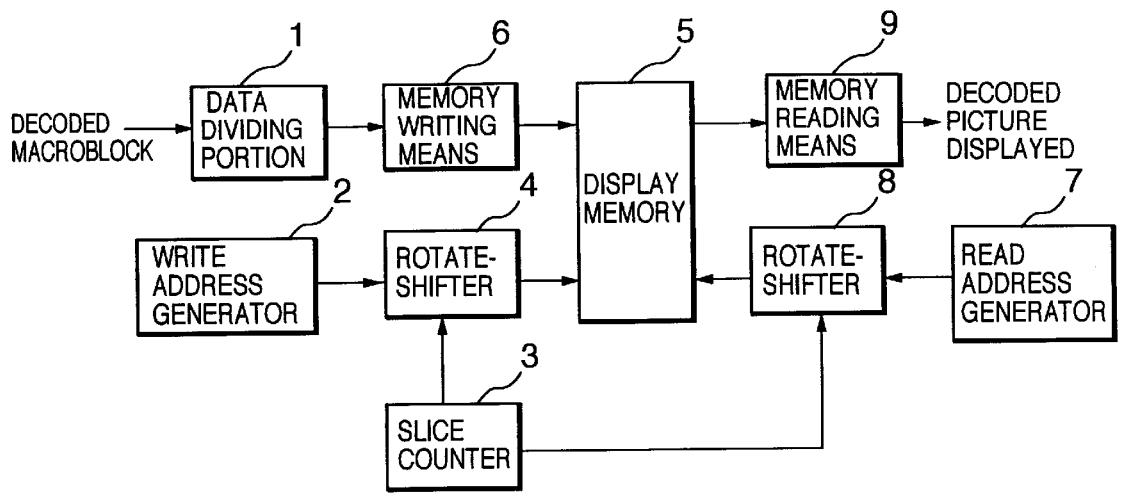
FIG. 1 is a block diagram showing the structure of an apparatus according to an embodiment of the present invention.

As shown in FIG. 1, the apparatus according to the embodiment of the present invention comprises a data dividing portion 1, a write address generator 2, a slice counter 3, a first rotate-shifter 4, a display memory 5, a memory writing means 6, a read address generator 7, a second rotate-shifter 8, and a memory reading means 9.

The data dividing portion 1 receives data from a decoder (not shown) that decodes picture data that has been encoded corresponding to the MPEG system. Data that is output from the decoder is picture data as one macroblock, of which is composed of $2^n \times 2^n$ pixels (for example, 16×16 pixels in the case that n is 4). The data dividing portion 1 divides the picture data as one macroblock into $2^n$ pieces of data arranged in the vertical direction, where $2^n$ pixels arranged in the horizontal direction (raster scanning direction) compose one word.

The write address generator 2 generates binary values of write addresses of which individual words of data divided by the data dividing portion 1 are written to the display memory 5. The write address generator 2 outputs "0" as the start address of the slice line and then binary values of write addresses that increment by "1" for individual words.

The slice counter 3 counts the number of slice lines to which data has been written in the display memory 5 (namely, the number of slice lines that have been decoded). Hereinafter, output data of the slice counter 3 is referred to as slice count value.

The first rotate-shifter 4 rotates and shifts the binary value of each write address that is output from the write address generator 2 to the left by (slice count value×n) bits. The first rotate-shifter 4 outputs the resultant data as a rotated-shifted write address.

The memory writing means 6 writes picture data to the display memory 5 corresponding to the rotated-shifted write address received from the first rotate-shifter 4.

The read address generator 7 generates binary values of read addresses with which picture data stored in the display memory 5 is displayed on a monitor in the raster scanning method.

The second rotate-shifter 8 rotates and shifts the binary value of each read address that is output from the read address generator 7 to the left by ((slice count value−1)×n) bits. The second rotate-shifter 8 outputs the resultant data as a rotated-shifted read address.

The memory reading means 9 reads each word of decoded picture data from the display memory 5 corresponding to the rotated-shifted read address received from the second rotate-shifter 8 in the order of the raster scanning method of a monitor (not shown) and then output to the monitor.

Next, the operation of the apparatus will be described.

Figure 2:
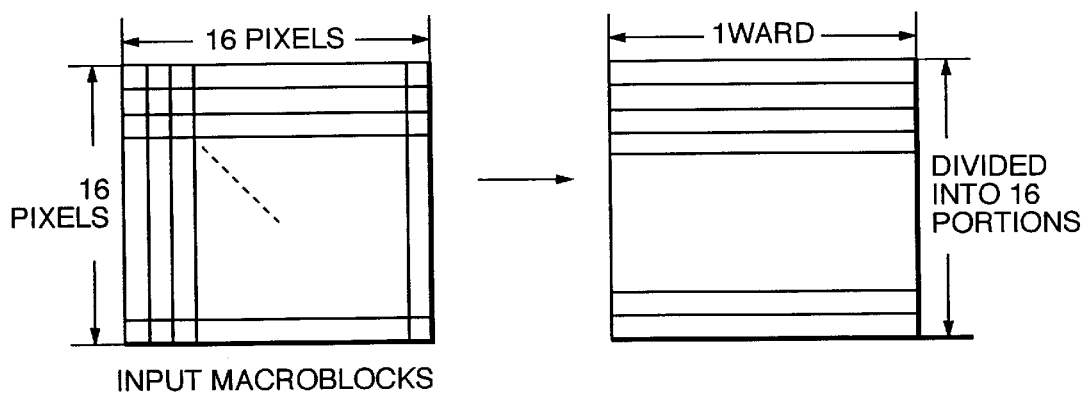
FIG. 2 is a schematic diagram showing a method for dividing macroblock of picture data that is input to the apparatus shown in FIG. 1.

Picture data of a first slice line as one macroblock that are received from the decoder is supplied to the data dividing means 1. As shown in FIG. 2, the data dividing means 1 divides data into $2^n$ pieces assuming that $2^n$ pixels arranged in the horizontal direction compose one word. In FIG. 2, the picture data as one macroblock is composed of 16×16 pixels. Thus, the data dividing means 1 divides decoded picture data as one macroblock into $2^4=16$ pieces.

The write address generator 2 generates binary values of write addresses that increment by "1" from "0" such as "0", "1", "2", "3", and so forth. The write address generator 2 outputs the binary values to the first rotate-shifter 4.

The first rotate-shifter 4 receives a slice count value from the slice counter 3 and rotates and shifts each write address received from the write address generator 2 corresponding to the slice count value in the following manner.

Since the initial slice count value is "0", the rotated-shifted amount is 0×n bits=0. Thus, as shown in FIG. 3, when the first slice line is input, the first rotate-shifter 4 does not rotate and shift data thereof. The write addresses received from the write address generator 2 are directly supplied to the display memory 5. The memory writing means 6 writes divided picture data as one macroblock to the individual addresses.

When data for one slice line has been written to the display memory 5, the slice counter 3 increments by "1" and thereby the count value thereof becomes "1". In addition, the read address generator 7 generates a read address and supplies the read address to the second rotate-shifter 8.

The second rotate-shifter 8 receives a slice count value "1" from the slice counter 3. In addition, the second rotate-shifter 8 rotates and shifts the binary value of the read address received from the read address generator 7 in the following manner.

The read address generator 7 outputs "0" as the binary value of the read address corresponding to the start word of the start line of the slice line. The read address generator 7 outputs a value of which $2^n$ is added to the binary value of the read address that has been generated as a read address corresponding to the next word. The read address generator 7 outputs binary values of read addresses that increment by $2^n$ for individual words until the current line is completed. When the current line is completed, the read address generator 7 obtains a value of which "1" is added to the start address of the preceding line and outputs the resultant value as a read address of the start word of the new line. Thereafter, likewise, until the current line is completed, the read address generator 7 outputs binary values of read addresses that increment by "$2^n$" for individual words.

When data of the first slice line is read, since the slice count value is "1", the rotated-shifted amount is ((1−1)×n)= 0. Thus, as shown in FIG. 4, a read address received from the read address generator 7 is supplied to the display memory 5 as it is. The memory reading means 9 reads data of the read address from the display memory 5. Thus, the picture data of the first slice line is displayed.

Figure 7:
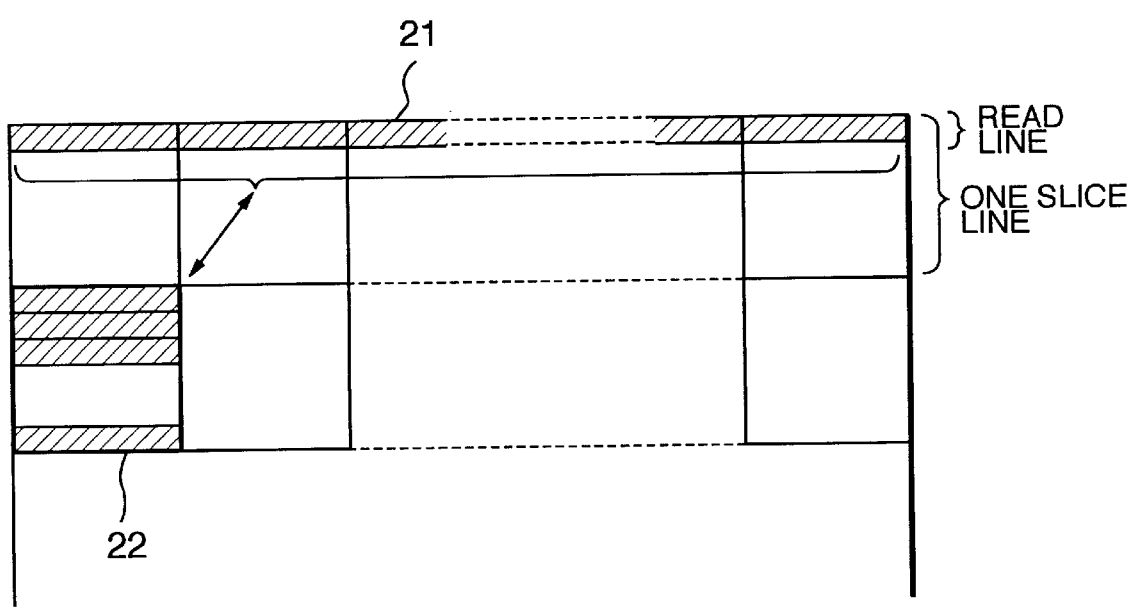
FIG. 7 is a schematic diagram showing the relation between an area from which data has been read and an area to which data of the next slice line is written, these areas being disposed in the display memory of the apparatus shown in FIG. 1.
Figure 8:
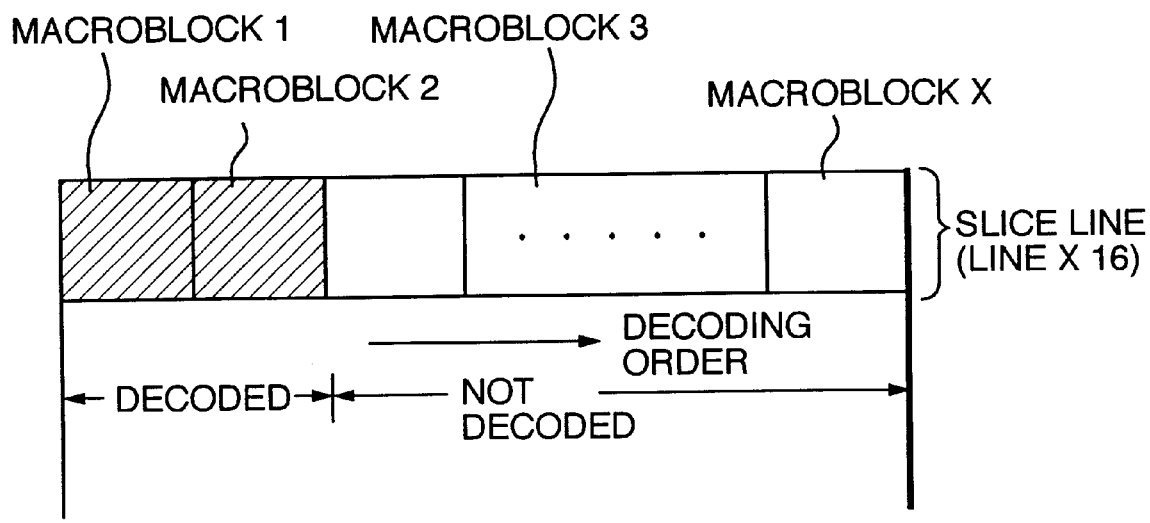
FIG. 8 is a schematic diagram for explaining a method for writing macroblock of decoded picture data to a display memory of a conventional apparatus.
Figure 9A:
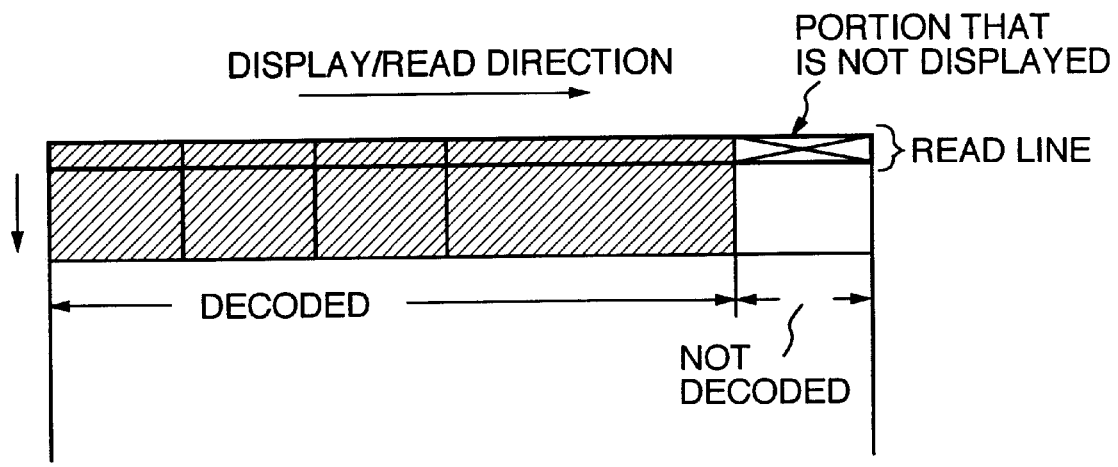
FIG. 9A is a schematic diagram for explaining a method for reading picture data from the display memory in the conventional apparatus.
Figure 9B:
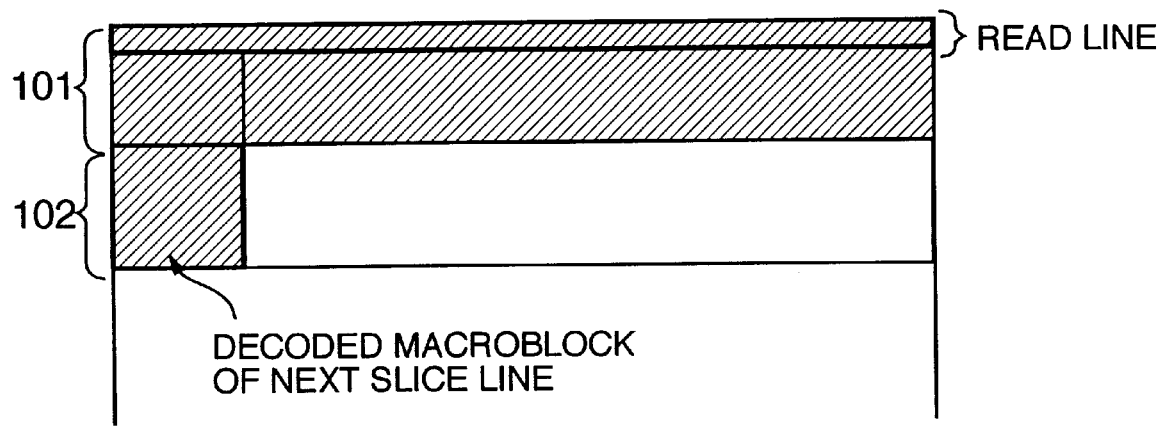
FIG. 9B is a schematic diagram for explaining a required storage capacity of the display memory of the conventional apparatus from a view point of a method for reading picture data from the display memory.
Figure 10:
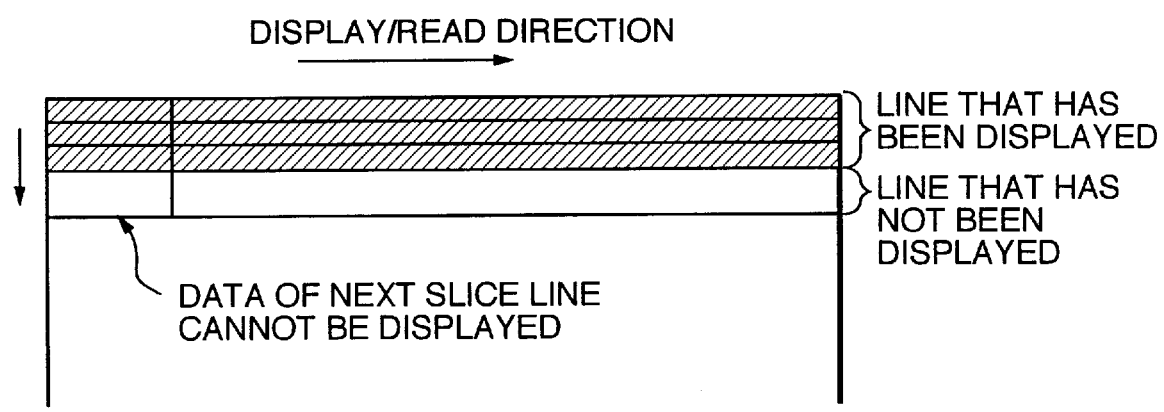
FIG. 10 is a schematic diagram for explaining a required storage capacity of the display memory of the conventional apparatus from a view point of a method for writing picture data to the display memory.

As shown in FIG. 7, when a line of picture data is read from the display memory 5, a line 21 of which data in the horizontal direction has been read is generated. A feature of the present invention is in that an area of which data has been read in the horizontal direction of the display memory 5 is assigned as a storing area 22 of data of the next slice line. Each address of the line 21 from which data has been read in the horizontal direction is equal to a value of which a binary value of each write address that is successively output from the write address generator 2 is multiplied by "$2^n$" that is the number of pixels in the vertical direction of the macroblock. The first rotate-shifter 4 generates each address of an area of which data has been read in the horizontal direction.

In other words, the first rotate-shifter 4 rotates and shifts the binary value of each write address received from the write address generator 2 to the left by (slice count value×n) bits. For example, when picture data of the second slice line is written to the display memory 5, since the slice count value is "1", the first rotate-shifter 4 rotates and shifts the binary value of each write address to the left by (1×n) bits. Thus, as shown in FIG. 5, when n is 4, the first rotate-shifter 4 successively outputs rotated-shifted write addresses such as "0", "16", "32", ..., "240" for individual words. Since data is written to the display memory 5 corresponding to the rotated-shifted write addresses, data as one macroblock of the next slice line can be written to an area of which data has been just read from the display memory 5 in the horizontal direction.

After the picture data of the first slice line has been displayed, when all data of the second slice line has been written to the display memory 5, the slice counter 3 increments the slice count value by "1". Thus, the slice counter 3 outputs a slice count value "2".

When data of the second slice line is read, since the slice count value is "2", the rotated-shifted amount of the second rotate-shifter 8 becomes (2−1)×n bits. Thus, the second rotate-shifter 8 rotates and shifts the binary value of each read address received from the read address generator 7 to the left by n bits and outputs the resultant data to the display memory 5.

Thus, as shown in FIG. 6, when n is 4, the second rotate-shifter 8 successively outputs rotated-shifted read addresses such as "0", "256", "512", and so forth for individual words. Thus, data of the second slice line is read from the display memory 5.

Likewise, the reading operation and the writing operation of subsequent slice lines from/to the display memory 5 are performed.

Thus, since the apparatus according to the embodiment is structured in such a manner that an area of the display memory 5 from which picture data of a particular slice line has been just read is assigned as a write area for picture data of the next slice line. Consequently, the storage capacitance required for the display memory 5 can be decreased. In other words, so far, the conventional apparatus required the storage capacity for two slice lines. However, with the apparatus according to the embodiment, the required storage capacity of the memory can be reduced to a storage capacity for one slice line.

In addition, the present invention can be also applied to picture data encoded in frame structure as well as picture data encoded in field structure. When picture data encoded in the frame structure is processed, picture data for one frame is decoded twice in one frame period (picture data for one frame is decoded for each field period). Picture data for one frame decoded in one field period is input to the apparatus according to the embodiment. Only data of one field is extracted and displayed. Picture data for one frame decoded in the other field period is input to the apparatus according to the embodiment. Only data of the other data is extracted and displayed. Thus, even if picture data encoded in the frame structure is processed, the required storage capacity necessary for the display memory can be suppressed to a storage capacity for less than two slice lines.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An apparatus for controlling a display memory for storing decoded picture data as one macroblock, comprising:

dividing means for dividing decoded picture data as one macroblock in a vertical direction;

write address generating means for generating the binary value of a write address necessary for writing the divided picture data to the display memory;

means for counting the number of slice lines of picture data that has been written to the display memory;

first shifting means for rotating and shifting the binary value of the generated write address to the left by a first bit number corresponding to the number of slice lines counted;

means for writing the divided picture data to the display memory corresponding to the write address that has been rotated and shifted;

read address generating means for generating the binary value of a read address necessary to read picture data from the display memory;

second shifting means for rotating and shifting the binary value of the generated read address to the left by a second bit number corresponding to output data of said counting means; and means for reading picture data from the display memory corresponding to the read address that has been rotated and shifted.

2. The apparatus as set forth in claim 1, wherein said dividing means divides the picture data decoded as one macroblock into $2^n$ pixels in the vertical direction of the macroblock, wherein said first shifting means rotates and shifts the binary value of the generated write address to the left by a first bit number of which the counted slice line number is multiplied by "n", and wherein said second shifting means rotates and shifts the binary value of the generated read address to the left by a second bit number of which a value of which "1" is subtracted from the counted slice line number is multiplied by "n".

3. The apparatus as set forth in claim 1, wherein said write address generating means successively generates binary values of write addresses that increment from "0" by "1" from the start slice line.

4. The apparatus as set forth in claim 1, wherein said read address generating means successively generates binary values of read addresses that increment from "0" by "1" as the start address of a line to be read whenever the line to be read is changed and successively generates binary values of read addresses that increment from the binary value of the start read address of the line to be read by "2$^n$".

5. A method for controlling a display memory for storing decoded picture data as one macroblock, comprising the steps of:

dividing decoded picture data as one macroblock in a vertical direction;

generating the binary value of a write address necessary for writing the divided picture data to the display memory;

rotating and shifting the binary value of the generated write address to the left by a first bit number corresponding to the number of slice lines counted;

writing the divided picture data to the display memory corresponding to the write address that has been rotated and shifted;

generating the binary value of a read address necessary to read picture data from the display memory;

rotating and shifting the binary value of the generated read address to the left by a second bit number corresponding to the number of splice lines of picture data that has been written to the display memory; and reading picture data from the display memory corresponding to the read address that has been rotated and shifted.

6. The method as set forth in claim 5, wherein the dividing step is performed by dividing the picture data decoded as one macroblock into $2^n$ pixels in the vertical direction of the macroblock, wherein the first shifting step is performed by rotating and shifting the binary value of the generated write address to the left by bits corresponding to a value of which the number of slice lines of picture data that has been written is multiplied by "n", and wherein the second shifting step is performed by rotating and shifting the binary value of the generated read address to the left by bits corresponding to a value of which "1" is subtracted from the number of slice lines that have been written to the display memory is multiplied by "n".

7. The method as set forth in claim 5, wherein the write address generating step is performed by successively generating binary values of write addresses that increment from "0" by "1" from the start slice line.

8. The method as set forth in claim 5, wherein the read address generating step is performed by successively generating binary values of read addresses that increment from "0" by "1" as the start address of a line to be read whenever the line to be read is changed and successively generating binary values of read addresses that increment from the binary value of the start read address of the line to be read by "1$^m$".

* * * * *